(12) United States Patent
Billebaud et al.

(10) Patent No.: US 8,519,039 B2
(45) Date of Patent: Aug. 27, 2013

(54) HALOGENATED POLYMER STABILIZING INGREDIENT CONTAINING A BETA-DICARBONYL COMPOUND

(75) Inventors: Valerie Billebaud, Asnieres-sur-Seine (FR); Valerie Legros, Velleparisis (FR); Sylvie Ghiringhelli, Vincennes (FR); Jean-Emile Zanetto, Paris (FR)

(73) Assignee: Rhodia Chimie, Aubervilliers (FR)

( * ) Notice: Subject to any disclaimer, the term of this patent is extended or adjusted under 35 U.S.C. 154(b) by 803 days.

(21) Appl. No.: 11/793,302

(22) PCT Filed: Dec. 16, 2005

(86) PCT No.: PCT/FR2005/003167
§ 371 (c)(1),
(2), (4) Date: Aug. 29, 2008

(87) PCT Pub. No.: WO2006/067314
PCT Pub. Date: Jun. 29, 2006

(65) Prior Publication Data
US 2009/0298986 A1     Dec. 3, 2009

(30) Foreign Application Priority Data
Dec. 20, 2004   (FR) ...................................... 04 13577

(51) Int. Cl.
*C08K 5/11*     (2006.01)

(52) U.S. Cl.
USPC ........... 524/314; 524/357; 524/567; 524/568; 524/569

(58) Field of Classification Search
USPC ................... 524/357, 314, 567–569
See application file for complete search history.

(56) References Cited

U.S. PATENT DOCUMENTS

| | | | | | |
|---|---|---|---|---|---|
| 4,556,519 | A | * | 12/1985 | Isshiki et al. | 562/891 |
| 5,194,476 | A | * | 3/1993 | Casarini et al. | 524/360 |
| 5,808,165 | A | | 9/1998 | Chassaing et al. | |
| 6,448,314 | B1 | | 9/2002 | Henrio | |

FOREIGN PATENT DOCUMENTS

| | | |
|---|---|---|
| EP | 0697390 A1 | 2/1996 |
| EP | 1229073 A2 | 8/2002 |
| JP | 08-183891 | 7/1996 |
| JP | 2002/506101 | 2/2002 |

* cited by examiner

*Primary Examiner* — Peter D Mulcahy
(74) *Attorney, Agent, or Firm* — Dentons US LLP (57) ABSTRACT

A subject matter of the present invention is a novel stabilizing ingredient for halogenated polymers comprising at least one β-carbonyl compound, an additive composition for halogenated polymers comprising the ingredient and a stabilized composition based on a halogenated polymer. The invention provides improvements as regards stabilization of halogenated polymers. The invention can in particular be applied to the stabilization of poly(vinyl chloride).

17 Claims, 1 Drawing Sheet

HALOGENATED POLYMER STABILIZING INGREDIENT CONTAINING A BETA-DICARBONYL COMPOUND

CROSS-REFERENCE TO PRIORITY APPLICATIONS

This application claims priority under 35 U.S.C. §119 of French Application FR 0413577, filed Dec. 20, 2004, and is the National Phase of PCT/FR 2005/003167, filed Dec. 16, 2005 and designating the United States, published on Jun. 29, 2006 as WO 2006/067314 A1, each hereby expressly incorporated by reference in its entirety and each assigned to the assignee hereof.

A subject matter of the present invention is a novel stabilizing ingredient for halogenated polymers comprising at least one β-carbonyl compound, an additive composition for halogenated polymers comprising the ingredient and a stabilized composition based on a halogenated polymer. The invention provides improvements as regards stabilization of halogenated polymers. The invention can in particular be applied to the stabilization of poly(vinyl chloride).

Halogenated polymers, in particular halogenated thermoplastic polymers, for example poly(vinyl chloride), are polymers widely used in industry. For many applications, it is necessary to add additives to these polymers, in particular stabilizers.

The stabilizers include β-dicarbonyl compounds. Such compounds are available commercially. Mention is made, by way of example, of the compounds sold under the Rhodiastab® trade mark by Rhodia. These compounds are stabilizing ingredients which can be used in combination with other additives. This combination can be given in material form and sold in the form of additive compositions. The stabilizing ingredients and/or the additive compositions are used in the preparation of stabilized compositions based on halogenated polymers, preferably thermoplastic halogenated polymers.

There is a constant search to improve stabilizing ingredients, additive compositions and stabilized compositions based on halogenated polymers, for example in terms of ease of processing and/or of stabilizing performance or stability and/or in terms of costs and/or in terms of safety profile for handling and/or in terms of toxicological or ecotoxicological profile and/or in terms of perception, rightly or wrongly, of these profiles by the scientific or industrial community or by the public.

The present invention meets at least one of the needs expressed above by providing a stabilizing ingredient for halogenated polymers comprising at least one β-dicarbonyl compound, characterized in that the ingredient is a composition comprising at least 90% by weight of the following products A and B:

product A: β-dicarbonyl compound or mixture of β-dicarbonyl compounds or complex mixture comprising at least one β-dicarbonyl compound, these mixtures comprising at least 5% by weight of β-dicarbonyl compounds, preferably at least 10% by weight, preferably at least 50% by weight, preferably at least 80% by weight, optionally at least 90% by weight, and product B: solvent which is liquid at 20° C. in which the product A is at least partially soluble, the product A being at least partially dissolved in the product B.

The invention also provides an additive composition for halogenated polymers comprising the stabilizing ingredient, or the products A and B taken separately, or the use of the stabilizing ingredient, or the products A and B taken separately, in an additive composition for halogenated polymers.

The invention also provides a stabilized composition based on a halogenated polymer, preferably a thermoplastic halogenated polymer, comprising:
  a halogenated polymer,
  the stabilizing ingredient, or the products A and B taken separately,
  optionally additives other than the stabilizing ingredient.

The invention also provides the use of the stabilizing ingredient, or the products A and B taken separately, in a composition based on a halogenated polymer, as stabilizing agent. The invention also provides the use of the additive composition, in a composition based on a halogenated polymer, as stabilizing agent.

In addition, the invention can exhibit at least one of the following advantages:
  improving the stabilization at a constant level of product A; the reference is to a synergy of the products A and B,
  retaining an acceptable stabilizing performance while using less product A; the reference is to a synergy of the products A and B, it being possible for the stabilization to be characterized by a low initial yellowing index and/or by a coloring stability,
  providing an advantageous compromise between an initial yellowing index and a coloring stability,
  providing an advantageous cost/performance compromise (for example as regards the above stabilizing properties),
  reducing the amounts of product A used, which is positive in terms of toxicological or ecotoxicological profile and/or in terms of perception, rightly or wrongly, of these profiles by the scientific or industrial community or by the public,
  improving safety in terms of handling of the products or the perception of this safety,
  facilitating processing of the products, in particular by providing a liquid.

The ingredients or the compositions participating in the implementation of the invention are described in detail below.

Product A

β-Dicarbonyl compounds and their processes of preparation are known to a person skilled in the art. Such compounds are available commercially. Depending on the process employed and on optional stages of purification, of recovery and/or of enhancement in value of byproducts and depending more generally on the requirements expected for the product, various types of products may be found:

pure or virtually pure β-dicarbonyl compounds comprising, for example, at least 95% by weight of a β-dicarbonyl product or even at least 99% by weight, mixtures of β-dicarbonyl compounds which are pure or virtually pure in β-dicarbonyl compounds, for example comprising at least 95% of β-dicarbonyl compounds, complex mixtures comprising a β-dicarbonyl compound or a mixture of β-dicarbonyl compounds and byproducts or impurities which are not β-dicarbonyl compounds, for example fatty acids, comprising at least 5% by weight of β-dicarbonyl compounds, preferably at least 10% by weight, preferably at least 50% by weight, preferably at least 80% by weight, generally less than 95% by weight. As the case may be, in particular in connection with the level of β-dicarbonyl compounds, it is possible to speak of "crude products", of "heavy residue products" or of "products resulting from heavy residues".

The proportions by weight in the product A can in particular be precisely evaluated by Gas Chromatography, where the results in % are comparable to proportions by weight. In order to carry out this analysis, 30 mg of product are diluted in 1 ml of chloroform, esterified (more specifically, the acids which may be present in the product are esterified) using excess diazomethane until a persistent yellow color is obtained (the excess is subsequently removed) and then treated with 20 ml of trimethylpentane. It is possible, more rapidly and less precisely but sufficiently to a first approximation, to determine the content of β-dicarbonyl compounds by potentiometry (the amount of acids is determined by potentiometry and then it is deducted from the product).

The β-dicarbonyl compound can in particular be in the completely organic form or in the form of a complex with a metal, with an alkali metal or with an alkaline earth metal, for example of a complex with zinc or calcium.

The product A can be obtained by a condensation reaction of an ester with a ketone in the presence of an alkaline agent, typically a strong base, such as an amide or an alkoxide.

More especially, the ester employed in the abovementioned condensation reaction corresponds to the following formula: $R^{1'}COOR^{2'}$, in which $R^{1'}$ represents a hydrocarbon radical exhibiting 1 to 30 carbon atoms, which is optionally interrupted by one or more —O—, —CO—O— or —CO— groups; and $R^{2'}$ represents a hydrocarbon radical comprising 1 to 4 carbon atoms.

More particularly, the radical $R^{1'}$ represents a linear or branched $C_1$-$C_{30}$, preferably $C_1$-$C_{24}$, alkyl or alkenyl radical; a $C_6$-$C_{30}$ aryl radical which is or is not substituted by at least one $C_1$-$C_{10}$ alkyl or $C_1$-$C_{10}$ alkoxy radical, one halogen atom and/or one silicon atom; or a $C_3$-$C_{14}$ cycloaliphatic radical. Said radical can optionally comprise carbon-carbon double bonds and can optionally be interrupted by one or more —O—, —CO—O— or —CO— groups.

Mention may be made, among the possible radicals, of the lauryl, myristyl, stearyl, isostearyl, palmityl, behenyl, lignoceryl, oleyl, palmitoleyl, linoleyl, linolenyl or benzyl radical, the benzyl radical optionally carrying one or more alkyl or alkoxy substituents.

As regards the radical $R^{2'}$, the latter preferably represents a $C_1$-$C_4$ alkyl radical. It should be noted that, depending on the nature of the alkaline agent, it may be advantageous to choose the radical $R^{2'}$ so that the corresponding alcohol is volatile under the conditions of the condensation reaction. Particularly advantageously, said radical is the methyl radical.

It should be noted that the ester may be found in its simple form or in a partially or completely condensed form. According to an embodiment, if the ester has a hydrogen in the α position with respect to the ester group, it may then be employed partially or completely in the form of β-ketoester. In this case, in the formula of the ester which is given above, the radical $R^{1'}$ can be replaced by $R^{1'}COR^{r1}$, in the formula of the ester which is given above. In this case, this formula becomes $R^{1'}COR^{r1}COOR^{2'}$, $R^{1'}$ having the same meaning as above and $R^{r1}$ likewise, except for the fact that it is a divalent radical.

The ketone employed in the condensation reaction corresponds more particularly to the following formula: $R^3COCH_2R^4$, in which $R^3$ represents a hydrocarbon radical exhibiting 1 to 30 carbon atoms which is optionally interrupted by one or more —O—, —CO—O— or —CO— groups; and $R^4$ represents a hydrogen atom or a hydrocarbon radical comprising at most 4 carbon atoms.

Preferably, the radical $R^3$ represents a linear or branched $C_1$-$C_{30}$, preferably $C_1$-$C_{24}$, alkyl or alkenyl radical; a $C_6$-$C_{30}$ aryl radical which is or is not substituted by at least one $C_1$-$C_{10}$ alkyl or $C_1$-$C_{10}$ alkoxy radical, one halogen atom and/or one silicon atom; or a $C_3$-$C_{14}$ cycloaliphatic radical. Said radical can optionally comprise carbon-carbon double bonds and can optionally be interrupted by one or more —O—, —CO—O— or —CO— groups.

Mention may be made, among the possible radicals, of the lauryl, myristyl, stearyl, isostearyl, palmityl, behenyl, lignoceryl, oleyl, palmitoleyl, linoleyl, linolenyl or benzyl radical, the benzyl radical optionally carrying one or more alkyl or alkoxy substituents.

As regards the radical $R^4$, the latter preferably represents a $C_1$-$C_4$ alkyl radical. Particularly advantageously, said radical is the methyl radical.

Usually, the molar ratio of the ketone to the ester lies within the range from 2/3 to 1/1. Preferably, the ester is present in an excess of up to 30 mol % with respect to the ketone and very preferably in an excess of 5 to 20 mol %.

The β-dicarbonyl compound can thus be of formula $R^{1'}COCH_2COR^3$, in which $R^{1'}$ and $R^3$ have the meanings given in detail above. It should be noted that it is not ruled out that $R^{1'}$ and $R^3$ be connected to one another so that the β-dicarbonyl compound is found in the form of a ring.

According to one embodiment of the invention, the reaction is carried out in the presence of a solvent. The latter is chosen from compounds which are inert under the reaction conditions.

It is conventionally chosen from aromatic, aliphatic or cyclic hydrocarbons, hydrocarbon fractions or ethers.

Preferably, the solvent is chosen from alkylbenzenes, such as toluene, dialkylbenzenes and trialkylbenzenes, but also isopropyl ether; toluene and xylene being preferred.

Furthermore, the condensation reaction is carried out in the presence of a basic agent (or "alkaline agent"). More specifically, said agent is chosen from amides, hydrides or alkoxides comprising 1 to 4 carbon atoms.

Usually, the number of moles of basic agent present during the reaction is such that the basic agent/sum of the moles of ester and of ketone molar ratio is in the region of 1.

According to a first embodiment, the condensation reaction is carried out in the presence of sodium hydride or, preferably, of sodamide.

Due to the presence of sodamide, it is preferable to carry out the reaction under inert atmosphere, preferably while flushing with nitrogen.

In addition, the reaction is carried out at a temperature preferably lying between 30 and 60° C.

According to a second embodiment of the invention, the basic agent is a sodium alkoxide, the corresponding alcohol of which is volatile under the conditions of the condensation reaction. Preferably, the alkoxide is sodium methoxide.

In addition, in this case, the solvent is chosen from those exhibiting a boiling point greater by at least 20° C. than the reaction temperature.

Preferably, the reaction is carried out at reflux of the solvent.

Whatever the alternative form selected, the reaction is preferably carried out by introducing the ketone into the ester comprising the basic agent and, if appropriate, the solvent.

Depending on the nature of the basic agent, it is wise to provide means for recovering either the ammonia produced or the alcohol produced.

In the specific case where said agent is an alkoxide, the removal of the alcohol produced as it appears in the reaction mixture represents a highly advantageous characteristic of the process and makes it possible, inter alia, to increase the yield of β-dicarbonyl compound desired.

At the end of the reaction, whatever, again, the alternative form selected, the reaction medium is preferably acidified.

For this purpose, the reaction mixture is introduced into an aqueous solution of an acid, the preferred ones of which are acetic acid, hydrochloric acid and sulfuric acid. The pH of the aqueous layer is adjusted to a value preferably of between 1 and 3.

After at least one washing with water, the solvent is removed by any suitable means, for example by evaporation, and a crude product is obtained.

This crude product comprises the desired β-dicarbonyl compound ($R^1COCH_2COR^3$), symmetrical homologs ($R^1COCH_2COR^{1'}$, $R^3COCH_2COR^3$), and byproducts. It can thus be a "complex mixture" as explained above.

It should be noted that the exact composition of the byproducts is very complex to evaluate. They can in particular originate from crotonization reactions of the β-dicarbonyl compounds with one another or from the appearance of entities comprising amide functional groups, if the basic agent comprises nitrogen.

According to a first possibility, the product A comprises a mixture corresponding to the crude product resulting from the condensation reaction.

In the case of this possibility, the content of β-dicarbonyl compounds is generally between 40 and 95% by weight, preferably between 40 and 80% by weight, and the content of byproducts from 5 to 60% by weight, preferably from 20 to 60% by weight.

The product A according to this possibility can exist in the form of a divided solid which, depending on the forming methods employed, can be in a form of a powder or alternatively of flakes.

Mention may be made, among the methods for forming the composition, without the intention to be limited, of flaking, precipitation from a solvent, cryogenic milling or spraying/drying in a gas stream.

Flaking makes it possible to remove the solvent from the reaction mixture by passing the solution over a continuously cooled rotating drum. The product, solidified at the surface of the drum, is recovered by a scraper in the form of flakes.

The technique of precipitating from a solvent consists, for example, in running the crude product in the molten form into a compound at ambient temperature which is not a good solvent at this temperature for this crude product, such as, for example, ethanol or methanol, and the precipitate formed is separated off.

As regards the cryogenic milling, this procedure is generally carried out by introducing, into a mill, liquid nitrogen or any other inert liquid gas, such as $CO_2$, and the crude reaction product in the form of lumps from a few millimeters to a few centimeters obtained by coarse milling or else by the flaking technique.

Finally, the spraying/drying method consists in spraying the crude reaction product in the molten state through a stream of cold inert gas introduced countercurrentwise or cocurrentwise.

According to a second possibility, the product A comprises a mixture corresponding to the product recovered during a purification stage and after separation from the β-dicarbonyl compound.

According to this alternative form, the crude product is recrystallized from an appropriate solvent, for example an alcohol, such as ethanol. The purified β-dicarbonyl compound is separated, in particular by filtration, from a solution comprising the solvent and a mixture of byproducts and β-dicarbonyl compounds. The solution is subsequently treated so as to remove the crystallization solvent, for example by evaporation. The product A according to this second possibility is thus recovered.

In accordance with this possibility, the content of β-dicarbonyl compounds is generally between 5 and less than 40% by weight and the content of byproducts from 60% to 95% by weight.

The product A according to this second possibility may exist in a solid and/or pasty form.

The β-dicarbonyl compound can in particular be:
5-methyl-1-phenylhexane-1,3-dione,
octanoylbenzoylmethane,
heptanoylbenzoylmethane,
stearoylbenzoylmethane,
dibenzoylmethane,
calcium or zinc acetylacetonate.

It would not be departing from the invention to employ, as product A, a mixture or a combination of several products which might be suitable as product A. In this case, all the values given with regard to the amounts of product A and to the β-dicarbonyl compounds which they comprise will relate to the mixture or to the combination.

Products which can be used are in particular the following:
  products based on 5-methyl-1-phenylhexane-1,3-dione, preferably comprising, as predominant β-dicarbonyl compound by weight (highest level of all the β-dicarbonyl compounds), 5-methyl-1-phenylhexane-1,3-dione, preferably comprising at least 50% by weight of β-dicarbonyl products, preferably comprising at least 50% by weight of 5-methyl-1-phenylhexane-1,3-dione, advantageously at least 80% by weight, more advantageously at least 95% by weight, of 5-methyl-1-phenylhexane-1,3-dione.

products based on octanoylbenzoylmethane or on heptanoylbenzoylmethane, preferably comprising, as predominant β-dicarbonyl compound by weight (highest level of all the β-dicarbonyl compounds), octanoylbenzoylmethane or heptanoylbenzoyl-methane, preferably comprising at least 50% by weight of β-dicarbonyl products, preferably comprising at least 50% by weight of octanoylbenzoylmethane or of heptanoylbenzoylmethane, advantageously at least 80% by weight, more advantageously at least 95% by weight, of octanoylbenzoylmethane or heptanoyl-benzoylmethane. Such products are sold, for example, by Rhodia under the name Rhodiastab® 92.

products based on stearoylbenzoylmethane, preferably comprising, as predominant β-dicarbonyl compound by weight (highest level of all the β-dicarbonyl compounds), stearoylbenzoylmethane, preferably comprising at least 50% by weight of β-dicarbonyl products, preferably comprising at least 50% by weight of stearoylbenzoylmethane, advantageously at least 80% by weight, more advantageously at least 95% by weight, of stearoylbenzoylmethane. Such products are sold, for example, by Rhodia under the name Rhodiastab® 50 or Rhodiastab® 55P or Rhodiastab® 55E.

products based on dibenzoylmethane, preferably comprising, as predominant β-dicarbonyl compound by weight (highest level of all the β-dicarbonyl compounds), dibenzoylmethane, preferably comprising at least 50% by weight of β-dicarbonyl products, preferably comprising at least 50% by weight of dibenzoylmethane, advantageously at least 80% by weight, more advantageously at least 95% by weight, of dibenzoylmethane. Such products are sold, for example, by Rhodia under the name Rhodiastab® 83.

products based on acetylacetonate complexes, for example based on metal complexes, preferably based on alkali metal or alkaline earth metal complexes, for example based on zinc or calcium acetylacetonate, advantageously comprising at least 80% by weight, preferably at least 95% by weight, of zinc or calcium acetylacetonate. Such products are sold, for example, by Rhodia under the name Rhodiastab® X7.

Product B

The product B is a solvent which is liquid at 20° C. in which the product A is at least partially soluble.

The product B can be chosen in particular from the following compounds:
- diesters of formula $R^1OOC—(CH_2)_n—COOR^2$, in which $R^1$ and $R^2$, which are identical or different, are linear or branched alkyl, aryl, alkaryl, or arylalkyl groups comprising 1 to 10 carbon atoms, preferably 1 to 6 carbon atoms, and n is a mean number from 2 to 4,
- dichloromethane,
- peroxide solvents,
- ketones, preferably acetophenone,
- propylene carbonates,
- 1-methylpyrrolidone, and their mixtures.

The diester can be a mixture of adipate diesters (n=4), of glutarate diesters (n=3), and of succinate diesters (n=2).

Advantageously, the product B is a diester chosen from:
- dimethyl adipate,
- a mixture of dimethyl adipate (for example, from 9 to 17 parts by weight, by Gas Chromatography), of dimethyl glutarate (for example, from 59 to 67 parts by weight) and of dimethyl succinate (for example, from 20 to 28 parts by weight), for example sold by Rhodia under the name Rhodiasolv® RPDE,
- diisobutyl adipate,
- a mixture of diisobutyl adipate (for example, from 9 to 17 parts by weight, by Gas Chromatography), of diisobutyl glutarate (for example, from 59 to 67 parts by weight) and of diisobutyl succinate (for example from 20 to 28 parts by weight), for example sold by Rhodia under the name Rhodiasolv® DIB.

Stabilizing Ingredient

The stabilizing ingredient of the invention comprises the product A and the product B. The product A is at least partially dissolved in the product B. Advantageously, at least 50% of the product A is dissolved, preferably at least 75%, preferably at least 95%, preferably 100%. The term "dissolved" is understood to mean that the product A does not form macroscopic separation of phases. The term "partially dissolved" is understood to mean that a separation of phases (for example by sedimentation or separation by settling) occurs, which phases can be isolated (for example by filtration or use of a separating funnel), the phase comprising the product B also comprising a portion of the product A in the dissolved form.

The nature and the proportions of products A and B can be chosen to this end.

The stabilizing ingredient can be prepared by any process appropriate for preparing a solution, for example by simple mixing, with optionally stirring and/or heating.

According to one advantageous embodiment:
- the ratio by weight of the product A to the product B is between 90/10 and 10/90,
- the ingredient comprises at least 1% by weight, preferably at least 10% by weight, of β-dicarbonyl compounds. The ingredient can comprise less than 90% by weight of β-dicarbonyl compounds, advantageously less than 50%.

Advantageously, the stabilizing ingredient is such that a stabilizing synergy is observed when 0.2 part by weight of the ingredient is introduced per 100 parts by weight of PVC comprising at least 25 parts by weight of a plasticizer. The products A and B (their nature) and their proportions are advantageously chosen to this end.

According to a specific embodiment:
- the product A is a product based on dibenzoylmethane,
- the product B is dimethyl adipate or a mixture of dimethyl adipate, dimethyl glutarate, and dimethyl succinate, and
- the ratio by weight of the product A to the product B is between 5/95 and 50/50, preferably between 10/90 and 45/55, preferably between 15/98 and 35/65.

According to another specific embodiment:
- the product A is based on 5-methyl-1-phenylhexane-1,3-dione,
- the product B is dimethyl adipate, or a mixture of dimethyl adipate, dimethyl glutarate, and dimethyl succinate, and
- the ratio by weight of the product A to the product B is between 75/25 and 10/90, preferably between 60/40 and 20/80.

According to another specific embodiment:
- the product A is based on stearoylbenzoylmethane,
- the product B is dimethyl adipate, or a mixture of dimethyl adipate, dimethyl glutarate, and dimethyl succinate, and
- the ratio by weight of the product A to the product B is between 75/25 and 10/90, preferably between 60/40 and 20/80.

Additive Composition

The additive composition according to the invention comprises the stabilizing ingredient, or the products A and B taken separately, and other additives. Such additive compositions often constitute intermediates, which may be commercially available, between the stabilizing ingredient and its final destination in a composition comprising a halogenated polymer. They are products generally comprising, as additives, compounds targeted at supplementing or improving the stabilization, at facilitating the implementation of processes for converting or adding polymers, or at modifying properties of compositions comprising the polymer, such as the mechanical properties or the appearance (transparency, color, and the like), or even at reducing the total cost of the composition comprising the polymer.

The additive composition is advantageously liquid. It can preferably comprise from 10 to 90% by weight of the stabilizing ingredient.

A person skilled in the art knows the additive compositions which may be of use. Thus, the other additives can be chosen from:
- stabilizing agents other than the β-dicarbonyl compounds of the product A,
- lubricating agents,
- plasticizers,
- fillers, for example compounds chosen from talc, calcium carbonate, kaolin, lime or titanium dioxide, alone or as mixtures,
- optionally PVC, if the composition is a masterblend comprising less than 50% by weight of PVC,
- their mixtures or combinations.

Other Stabilizing Agents

The additive composition can optionally comprise at least one additive chosen from compounds comprising a metal chosen from Groups IIA, IIB and IVB of the Periodic Table of the Elements (which appeared in the Supplement to the Bulletin de la Société Chimique de France, No. 1, January 1966) or else one additive chosen from compounds of the type of the uracils.

As regards the compounds comprising a metal, said metal is chosen more particularly from calcium, barium, magnesium, strontium, zinc, tin or lead.

It should be noted that combinations of several of these stabilizing compounds can be envisaged, such as, for example, a mixture of stabilizing compounds based on calcium and zinc.

As regards the additives comprising at least one of the elements from the Groups IIB and IIA, mention may very particularly be made of the metal salts (soaps) of organic acids, such as aliphatic or aromatic carboxylic acids or fatty acids, or of phenolates or of aromatic alkoxides.

The most commonly used are, for example, the salts of the IIA or IIB elements of maleic, acetic, diacetic, propionic, hexanoic, 2-ethylhexanoic, decanoic, undecanoic, lauric, myristic, palmitic, stearic, oleic, ricinoleic, behenic (docosanoic), hydroxystearic, hydroxyundecanoic, benzoic, phenylacetic, para-(tert-butyl)benzoic and salicylic acids, phenolates, alkoxides derived from naphthol or phenols substituted by one or more alkyl radicals, such as nonylphenols.

Preferably, the additive is chosen from propionate, oleate, stearate, laurate, ricinoleate, docosanoate, benzoate, para-(tert-butyl)benzoate, salicylate, maleate, mono(2-ethylhexyl), nonylphenate or naphthenate alkaline earth metal salts.

As regards the compounds comprising lead, mention may in particular be made of those described in Encyclopedia of PVC by Leonard I. Nass (1976), pages 299-303.

These are highly diverse compounds, the most commonly used of which are dibasic lead carbonate, tribasic lead sulfate, tetrabasic lead sulfate, dibasic lead phosphite, lead orthosilicate, basic lead silicate, the coprecipitate of lead sulfate and silicate, basic lead chlorosilicate, the coprecipitate of silica gel and of lead orthosilicate, dibasic lead phthalate, neutral lead stearate, dibasic lead stearate, tetrabasic lead fumarate, dibasic lead maleate, lead 2-ethylhexanoate or lead laurate.

For that which relates to tin-based compounds, reference may in particular be made to the work "Plastics Additives Handbook" by Gachter/Muller (1985), pages 204-210, or to "Encyclopedia of PVC" by Leonard I. Nass (1976), pages 313-325.

These are more particularly mono- or dialkyltin carboxylates and mono- or dialkyltin mercaptides.

Among these compounds, the most commonly used are di(n-methyl)tin, di(n-butyl)tin or di(n-octyl)tin derivatives, such as, for example, dibutyltin dilaurate, dibutyltin maleate, dibutyltin laurate-maleate, dibutyltin bis(mono($C_4$-$C_8$-alkyl) maleate), dibutyltin bis(lauryl mercaptide), dibutyltin S,S'-bis(isooctyl mercaptoacetate), dibutyltin β-mercaptopropionate, di(n-octyl)tin maleate polymer, di(n-octyl)tin S,S'-bis(isooctyl mercaptoacetate) or di(n-octyl)tin β-mercaptopropionate. The monoalkylated derivatives of the abovementioned compounds are also suitable.

The additives chosen from uracils are more particularly derivatives of 6-aminouracil or 6-aminothiouracil type carrying substituents in the 1 and 3 positions. Said substituents in the 1 and 3 positions are more especially $C_1$-$C_{12}$ alkyl, $C_3$-$C_6$ alkenyl, $C_5$-$C_8$ cycloalkyl or $C_7$-$C_9$ alkylphenyl radicals; said radicals optionally being substituted by one to three $C_1$-$C_4$ alkyl or alkoxy groups, $C_5$-$C_8$ cycloalkyl groups, hydroxyl radicals or chlorine atoms. The use of this type of additive has been disclosed in particular in EP 1 046 668 and U.S. Pat. No. 4,656,209.

Lubricating Agents or Others

The additive composition can comprise at least one additive chosen from waxes; monoalcohols; polyols; compounds comprising one or more epoxide functional groups; saturated or unsaturated fatty acids and their esters; isocyanurates; polysiloxane oils or resins, or else silanes; alone or as a mixture.

Mention may in particular be made, among the waxes which can be used, of montanate waxes, polyethylene waxes or their oxidized derivatives, and paraffin waxes.

As regards the monoalcohols, the latter are advantageously saturated or unsaturated aliphatic alcohols comprising 12 to 30 carbon atoms. Mention may be made, by way of examples, without intention of being limited thereto, of lauryl, myristyl, stearyl, isostearyl, cetyl, behenyl, lauroleyl, oleyl, erucyl and linoleyl alcohols, alone or as a mixture.

The polyols can preferably comprise from 2 to 32 carbon atoms exhibiting 2 to 9 hydroxyl groups, it being possible for the hydroxyl functional groups to be carried by atoms, preferably carbon atoms, which are or are not vicinal.

Mention may be made, among these compounds, of diols, such as propylene glycol, butylene glycol, butanediol, pentanediol, hexanediol, dodecanediol or neopentyl glycol, polyols, such as trimethylolpropane, pentaerythritol, dipentaerythritol, tripentaerythritol, xylitol, mannitol, sorbitol, glycerol or mixtures of glycerol oligomers exhibiting a degree of polymerization of 2 to 10, hydroxystearyl alcohol or ricinoleyl alcohol.

Another family of polyols which may be suitably employed is composed of poly(vinyl alcohol)s, optionally partially acetylated.

The compounds exhibiting one or more epoxide functional groups are preferably chosen from epoxidized vegetable oils, such as epoxidized soybean oil, epoxidized castor oil or epoxidized linseed oil, epoxidized fish oil, as well as epoxidized fatty acid esters.

Mention may be made, among fatty acids, which are more particularly saturated or unsaturated and linear or branched carboxylic acids comprising 12 to 30 carbon atoms and optionally comprising one or more hydroxyl groups, of, inter alia, stearic acid, isostearic acid, lauric acid, myristic acid, palmitic acid, oleic acid, ricinoleic acid, behenic (docosanoic) acid, linoleic acid, linolenic acid, hydroxystearic acid or any other acid originating from natural or normatural glycerides or triglycerides suitable for the implementation of the invention. The acids can be employed alone or as a mixture.

As regards the esters of the abovementioned acids, the esters obtained from monoalcohols comprising 1 to 30 carbon atoms or the mono- or polyesters obtained from polyols, such as, for example, derivatives of glycerol or alkylene glycols, such as propylene glycol, are suitable in particular.

It is likewise possible to use isocyanurates, in particular exhibiting one or more hydroxyl groups, such as, for example, tris(2-hydroxyethyl) isocyanurate.

Mention may be made, among the polysiloxane oils or resins, inter alia, of polydialkylsiloxane oils or polyhydroalkylsiloxane oils for which the alkyl radical comprises 1 to 3 carbon atoms and preferably corresponds to a methyl radical.

These oils correspond to the following general formula: YO—[(R)Si(R)—O]$_x$—Y, in which formula R, which are identical or different, represent an alkyl radical comprising 1 to 3 carbon atoms, preferably a methyl, or a hydrogen atom, provided that only one of the two radicals is a hydrogen, and Y represents a hydrogen atom or (R')$_3$Si, with R', which are identical or different, representing an alkyl radical comprising 1 to 3 carbon atoms, preferably the methyl radical. The coefficient x varies within a wide range but is more particularly between 5 and 300.

Functionalized polymethylsiloxane oils, such as, for example, γ-hydroxy-propylenated oils, are also suitable.

Finally, as regards the polysiloxane resins, use is very particularly made of the resins obtained by the action of polyhydrosiloxane oils on polysiloxane oils carrying vinyl groups, in the presence of a platinum-based catalyst.

It is likewise possible to employ polysiloxane resins obtained by hydrolysis and self-condensation of at least one silane of formula (RO)$_3$SiF or (RO)$_2$(Me)SiF, in which R, which are identical or different, represent an alkyl radical comprising 1 to 4 carbon atoms and F more particularly represents the following radicals:

The abovementioned silanes can also be used.

Plasticizers

Among the plasticizers which can be used, alkyl phthalates, such as di(2-ethylhexyl) phthalate; esters of linear $C_6$-$C_8$ diacids, such as adipates; citrates; esters of benzoic monoacids or polyacids, such as benzoates or trimellitates; phosphate esters; or phenol sulfonate esters; alone or as mixtures, are suitable.

Halogenated Polymer and Compositions Based on the Halogenated Polymer

The invention also relates to a stabilized composition based on a halogenated polymer comprising:
 a halogenated polymer,
 the stabilizing ingredient, or the products A and B, taken separately,
 optionally additives other than the stabilizing ingredient.
  The additives can be chosen from those mentioned for the additive composition.

The halogenated polymer is preferably a thermoplastic halogenated polymer.

The halogenated polymer is preferably a chlorinated polymer, preferably poly(vinyl chloride).

The term "poly(vinyl chloride)" is understood to mean compositions in which the polymer is a vinyl chloride homopolymer. The homopolymer may be chemically modified, for example by chlorination.

Numerous vinyl chloride copolymers can also be employed stabilized. These are in particular polymers obtained by copolymerization of vinyl chloride with monomers exhibiting an ethylenically polymerizable bond, such as, for example, vinyl acetate; vinylidene chloride; maleic acid, fumaric acid or their esters; olefins, such as ethylene, propylene or hexene; acrylic or methacrylic esters; styrene; or vinyl ethers, such as vinyl dodecyl ether.

Usually, the copolymers comprise at least 50% by weight of vinyl chloride units and preferably at least 80% by weight of such units.

The poly(vinyl chloride), alone or as a mixture with other polymers, is the most widely used chlorinated polymer in the stabilized formulations according to the invention.

Generally, any type of poly(vinyl chloride) is suitable, whatever its method of preparation. Thus, polymers obtained, for example, by carrying out bulk, suspension or emulsion processes can be stabilized by using compositions according to the invention, whatever the intrinsic viscosity of the polymer.

The stabilized composition can advantageously comprise from 0.01 to 2 parts by weight of the stabilizing ingredient per 100 parts of the polymer. Preferably, this amount is from 0.05 to 0.5 part.

The stabilized composition can advantageously comprise from 0.005 to 1 part by weight of β-dicarbonyl compounds per 100 parts of the polymer. Preferably, this amount is from 0.05 to 0.5 part.

The stabilized composition can comprise additives, in particular those mentioned for the additive composition.

When it is present, the total amount of plasticizer is between 5 and 200 parts by weight per 100 parts by weight of halogenated polymer.

The stabilized composition can comprise at least one additive chosen from compounds comprising a metal chosen from Groups IIA, IIB and IVB of the Periodic Table of the Elements. If they are present, the content of these compounds usually varies between 0.1 and 4 g per 100 g of halogenated polymer, preferably between 0.3 and 2 g of halogenated polymer.

If an acid scavenger is present in the stabilized composition, and such is preferably the case, the total content of this compound is between 0.01 and 10 g per 100 g of halogenated polymer, more particularly between 0.05 and 5 g, with respect to the same reference.

The stabilized composition can furthermore comprise an additive chosen from dihydropyridines, compounds of uracil and thiouracil type, such as in particular those described above, or dehydroacetic acid. More especially, regarding the dihydropyridines, use may be made of those of the type of the 2,6-dimethyl-3,5-dicarboxylate-1,4-dihydropyridines, the carboxylate radicals of which, of formula ROCO—, which are identical or different, are such that R represents a linear or branched C1-C36 alkyl radical; a cyclic radical having less than 14 carbon atoms and optionally carrying an ethylenic bond and/or at least one C1-C22 alkyl substituent; or an aryl radical having less than 14 carbon atoms and optionally carrying at least one C1-C22 alkyl substituent. If such compounds are present in the stabilized composition, their content generally varies between 0.005 and 5 g per 100 g of halogenated polymer, preferably between 0.2 and 1.5 g per 100 g of halogenated polymer.

The stabilized composition can likewise optionally comprise at least one additive chosen from monoalcohols and/or polyols, such as in particular those mentioned in the context of the description of the composition according to the invention. If the stabilized composition comprises this type of additive, the total content is advantageously between 0.05 and 5 g per 100 g of halogenated polymer. More particularly, it is less than 2 g per 100 g of halogenated polymer.

The stabilized composition can also comprise at least one compound comprising one or more epoxide functional groups. If this type of compound is present in the stabilized composition, its overall content is advantageously between 0.5 and 10 g per 100 g of halogenated polymer.

The possibility is not excluded of the stabilized composition comprising at least one compound chosen from waxes; saturated or unsaturated fatty acids and their esters; polysiloxane oils or resins or also silanes; alone or as a mixture. If it is present, the total content of this type of compound generally varies between 0.05 and 2 g per 100 g of halogenated polymer.

The stabilized composition can likewise comprise compounds of the type of the organic phosphites, such as, for example, trialkyl, aryl, triaryl, dialkylaryl, or diarylalkyl phosphites, for which the term "alkyl" denotes hydrocarbon groups of $C_8$-$C_{22}$ monoalcohols or polyols and the term "aryl" denotes aromatic groups of phenol or of phenol substituted by $C_6$-$C_{12}$ alkyl groups. Use may likewise be made of calcium phosphites, such as, for example, compounds of the Ca(HPO$_3$).(H$_2$O) type, and phosphite-hydroxy-aluminumcalcium complexes. The content of additive of this type is usually between 0.1 and 7 g per 100 g of halogenated polymer, when it is employed.

If the stabilized composition includes one or more fillers, depending on the final application of the polymer and the forming method used, their total content usually represents 2 to 150 g per 100 g of halogenated polymer. More particularly, in the case of stabilized compositions intended for the preparation of profiles, for example, the content of filler is between 2 and 8 g per 100 g of halogenated polymer. In the case of formulations intended for flexible or semirigid applications, for example of the type of cables, the content of filler is more particularly between 30 and 150 g per 100 g of halogenated polymer.

Other conventional additives can supplement the stabilized composition or the additive composition, depending on the application for which it is intended.

Thus, the composition can comprise phenolic antioxidants or UV stabilizers, such as 2-hydroxybenzophenones, 2-hydroxybenzotriazoles or sterically hindered amines, usually known under the term HALS.

The content of this type of additive generally varies between 0.05 and 3 g per 100 g of halogenated polymer, when they are present.

In addition, the compositions can also comprise colored or white pigments, such as, in particular, cerium sulfide or titanium dioxide, in particular in the rutile form, and preferably having been subjected to a surface treatment.

It should be noted that the amount of pigment introduced into the composition varies within wide limits and depends in particular on the coloring power of the pigment and on the final coloring desired. However, by way of example and if the stabilized composition comprises it, the amount of pigment can vary from 0.1 to 20 g per 100 g of halogenated polymer, preferably from 0.5 to 15 g, with respect to the same reference.

The stabilized composition can in particular be a flexible or semirigid composition comprising a plasticizer in the form of a powder or granules intended to be formed or in the form of formed manufactured products. They can be cables, in particular insulation sheaths, injection-molded connectors, films, bottles, coverings for the construction and public works sector, in particular floor coverings, or sheets.

The possibility is not excluded of the stabilized composition being a rigid composition not comprising or comprising only a small amount of plasticizer in the form of a powder or granules intended to be formed or in the form of formed manufactured products. They can be profiled articles, for example door or window frames.

The stabilized composition according to the invention can be prepared and/or formed by any means known to a person skilled in the art.

Use may be made in particular of a stage of introducing the following ingredients into the molten halogenated polymer:
- the stabilizing ingredient or the products A and B, taken separately,
- optionally a plasticizer,
- optionally other additives, other than the plasticizer and the stabilizing ingredient,
- the ingredient, the optional other additives and the optional plasticizer optionally being introduced in the form of an additive composition.

The composition according to the invention and the various constituents can be incorporated in the halogenated polymer individually or alternatively after having prepared a mixture of several of these constituents beforehand.

Conventional incorporating methods are entirely suitable for the preparation of the stabilized composition.

Thus, and only by way of indication, this operation can be carried out in a mixer equipped with a system of blades and baffles operating at a high speed.

Generally, the mixing operation is carried out at a temperature of less than 130° C.

Once the mixture has been produced, the composition is formed according to methods which are conventional in the field, such as injection molding, extrusion-blow molding, extrusion, calendering or rotational or coating molding.

The temperature at which the forming is carried out generally varies from 150 to 220° C.

Other details or advantages of the invention may become apparent in the light of the examples which follow, without a limiting nature.

EXAMPLES

In the examples, the letter "C" is used for "comparative".

Examples 1 to 3

Stabilizing Ingredients

The following stabilizing ingredients presented in table I are prepared. These ingredients are liquid.

TABLE I

| Example | 1 | 2 | 3 |
|---|---|---|---|
| Name of the ingredient | RH82/RPDE 50/50 | RH92/RPDE 50/50 | RH83/RPDE 20/80 |
| Product A (Rhodiastab ® XX, supplier Rhodia) Proportion by weight | XX = 82* 50% | XX = 92 50% | XX = 83 20% |
| Product B: (Rhodiasolv RPDE, Rhodia) Proportion by weight | 50% | 50% | 80% |

*5-methyl-1-phenylhexane-1,3-dione.

Procedure:

The two products are mixed for 20 minutes at a temperature of approximately 80° C. with magnetic stirring in order to obtain a total amount of 15 g.

Comparative Examples 4 to 7

Ingredients

The following ingredients presented in table II are obtained in the same way. These ingredients are liquid (except that of example 6C).

TABLE II

| Example | 4C | 5C | 6C | 7C |
|---|---|---|---|---|
| Name of the ingredient | RH82 | RH92 | RH83 (solid) | RPDE |
| Product A (Rhodiastab ® XX, supplier Rhodia) Proportion by weight | XX = 82* 100% | XX = 92 100% | XX = 83 100% | 0% |
| Product B: (Rhodiasolv RPDE, Rhodia) Proportion by weight | 0% | 0% | 0% | 100% |

*5-methyl-1-phenylhexane-1,3-dione.

Examples 8 to 16

PVC-Based Compositions

The PVC-based compositions presented in table IV, comprising the ingredients according to table III, are prepared.

TABLE III

| Nature | Product | Supplier | Amount (parts by weight) |
|---|---|---|---|
| PVC | Solvin 271 PC | Solvay | 100 |
| Plasticizer | DIDP | Exxon | 25 |
| Additive (Lubricating agent/ stabilizing agent) | Epoxidized soybean oil: Edenol D82H | Cognis | 1 |
| Additive | Calcium stearate PSE | CECA/ATO | 0.4 |
| Additive | Zinc stearate ZN70 | CECA/ATO | 0.15 |
| Stabilizing ingredient tested | Ingredients according to examples 1 to 7 and according to table IV | | |

TABLE IV

| Example | 8 | 9C | 10C | 11C | 12C |
|---|---|---|---|---|---|
| Name of the composition | RH82/RPDE | RH82 | RH82 0.1 pcr | RPDE | "Without Rhodiastab" |
| Stabilizing ingredient | RH82/RPDE 50/50 | RH82 | RH82 | RPDE | / |
| Amount of the stabilizing ingredient (parts by weight) | 0.2 | 0.2 | 0.1 | 0.2 | 0 |

| Example | 13 | 14C | 15 | 16C |
|---|---|---|---|---|
| Name of the composition | RH92/RPDE | RH92 | RH83/RPDE | RH83 |
| Stabilizing ingredient | RH92/RPDE 50/50 | RH92 | RH83/RPDE | RH83 |
| Amount of the stabilizing ingredient (parts by weight) | 0.2 | 0.2 | 0.2 | 0.2 |

Process for the Preparation of the Compositions:

All the ingredients except the stabilizing ingredient are mixed at 2400 rev/min up to 60° C. in a mixer of Papenmeier type. The stabilizing ingredient to be tested is subsequently incorporated manually in the mixture. The combined mixture is converted on a Troester mixer, without friction, at 190° C. A PVC sample is withdrawn at regular time intervals (after 3 minutes, 6 minutes, 9 minutes, 12 minutes, 15 minutes and 20 minutes) and is used to prepare a PVC pellet.

The properties of the compositions are evaluated according to the following tests:

Initial Coloring: Yellowing Index and Lightness

The yellowing index and the lightness are measured using a Minolta CR-200® calorimeter and are expressed respectively by the b* and L* coordinates in the L*a*b* color space (CIELAB).

The initial coloring of the formulation is given by the calorimetric measurement of the 1st pellet at 3 minutes.

The lower the yellowing index (b*) and the greater the lightness (L*), the better the stabilization.

Coloring Stability

The coloring stability (CS) of the formulation corresponds to the time at which the yellowing index has changed by 2 points.

This value is measured from the graph of the change in the yellowing index as a function of the time (thermal stability curve).

The greater the CS value, the better the stabilization.

The variation in color of the pellets as a function of the duration of the test, and in particular the initial yellowing index (1st pellet), is directly correlated to the thermal stability of the PVC. The tests are in particular representative of the stability in a device for the preparation of stabilized and/or formed compositions. The compositions generally remain in these devices for only a short time. The initial coloring (1st pellet), more particularly the yellowing index, is thus the most important property. If the composition were to remain for a longer time in the devices, a poor stability can result in a poor quality of the product (color, mechanical properties) and in scrapping and/or in a deterioration in the devices. The stability (the coloring) at subsequent times is thus targeted at establishing operational safety. Long times, of the order of 20 minutes, are extreme cases which are never in practice implemented.

Results

The results of the evaluation of each stabilizing ingredient in terms of initial coloring (b, L) and coloring stability are recorded in the following table V:

TABLE V

| | Example | | | | |
|---|---|---|---|---|---|
| | 8 | 9C | 10C | 11C | 12C |
| Name of the composition | RH82/RPDE | RH82 | RH82 0.1 pcr | RPDE | "Without Rhodiastab" |
| Stabilizing ingredient | RH82/RPDE 50/50 | RH82 | RH82 | RPDE | / |
| Amount of the stabilizing ingredient (parts by weight) | 0.2 | 0.2 | 0.1 | 0.2 | 0 |
| Initial coloring | | | | | |
| b | 3.0 | 3.2 | 3.3 | 11.6 | 16.4 |
| L | 74.9 | 74.7 | 72.7 | 72.3 | 72.4 |
| Coloring stability | 7.4 | 7 | 6.2 | 3.8 | 3.8 |

| | Example | | | |
|---|---|---|---|---|
| | 13 | 14C | 15 | 16C |
| Name of the composition | RH92/RPDE | RH92 | RH83/RPDE | RH83 |
| Stabilizing ingredient | RH92/RPDE 50/50 | RH92 | RH83/RPDE 20/80 | RH83 |
| Amount of the stabilizing ingredient (parts by weight) | 0.2 | 0.2 | 0.2 | 0.2 |
| Initial coloring | | | | |
| b | 3.9 | 3.7 | 3.5 | 4 |
| L | 74.9 | 74.2 | 76.4 | 74.9 |
| Coloring stability | 6.7 | 6.4 | 6.1 | 7 |

Figure 1:
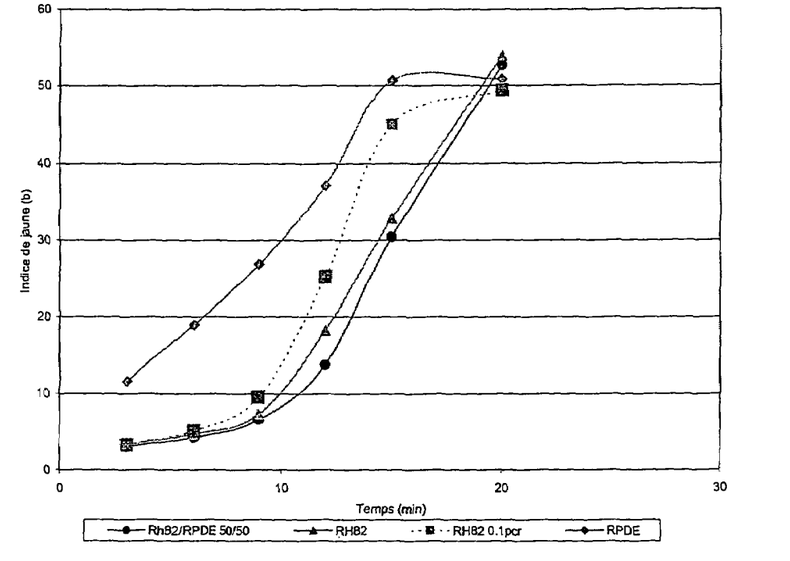

The change in the yellowing index over time for examples 8, 9C, 10C and 11C is illustrated in FIG. 1. This figure, and the specific initial coloring values given in table V, illustrate a stabilizing synergy:

better stability at a level of product A (β-dicarbonyl compounds) which is constant (0.1 pcr), better stability than with each of the ingredients.

Examples 17 to 20

Stabilizing Ingredients

The stabilizing ingredients of table VI below are prepared as indicated for examples 1 to 3.

TABLE VI

| Example | 17 | 18 | 19 | 20 |
|---|---|---|---|---|
| Name of the ingredient | RH83/RPDE 20/80 | RH83/Ac. 20/80 | RH83/NMP 20/80 | RH83/DIB 20/80 |
| Product A (Rhodiastab ® XX, supplier Rhodia) Proportion by weight | XX = 83 20% | XX = 83 20% | XX = 83 20% | XX = 83 20% |
| Product B: Nature, Proportion by weight | Rhodiasolv RPDE, Rhodia. 76% | Acetophenone 80% | NMP 80% | Rhodiasolv DIB, Rhodia. 80% |

Examples 21 to 24

PVC-Based Compositions

The compositions of table VII below are prepared and evaluated as indicated for examples 8 to 16.

This series of examples is carried out separately from examples 8 to 16, starting from different batches of ingredients. The results are not directly comparable quantitatively with the results from examples 8 to 16.

TABLE VII

| Example | 21 | 22 | 23 | 24 |
|---|---|---|---|---|
| Name of the composition | RH83/RPDE 20/80 | RH83/Ac. 20/80 | RH83/NMP 20/80 | RH83/DIB 20/80 |
| Stabilizing ingredient | RH83/RPDE 20/80 | RH83/Ac. 20/80 | RH83/NMP 20/80 | RH83/DIB 20/80 |
| Amount of the stabilizing ingredient (parts by weight) | 0.2 confirm | 0.2 confirm | 0.2 confirm | 0.2 confirm |
| Initial coloring | | | | |
| b | 4.8 | 5.5 | 5.9 | 5.4 |
| L | 73.3 | 70.8 | 73.1 | 73.2 |
| Coloring stability | 5.7 | 5.6 | 5.2 | 5.7 |

What is claimed is:

1. A stabilizing ingredient for halogenated polymers, comprising at least one β-dicarbonyl compound, said ingredient comprising a composition containing at least 90% by weight of the following products A and B:
   product A: a β-dicarbonyl compound or mixture of β-dicarbonyl compounds or complex mixture which comprises at least one β-dicarbonyl compound, said mixtures containing at least 5% by weight of β-dicarbonyl compounds, and
   product B: a solvent which is liquid at 20° C. in which the product A is at least partially soluble, wherein the solvent comprises at least one diester of formula $R^1OOC-(CH_2)_n-COOR^2$, in which $R^1$ and $R^2$, which may be identical or different, are each linear or branched $C_1$-$C_6$ alkyl, or aryl, alkaryl, or arylalkyl radicals having up to 10 carbon atoms, and n is a mean number ranging from 2 to 4, and said product A being at least partially dissolved in said product B;
   wherein the ratio by weight of the product A to the product B is from 90/10 to 10/90; and
   wherein the dicarbonyl compounds are selected from the group consisting of:
   5-methyl-1-phenylhexane-1,3-dione,
   octanoylbenzoylmethane,
   heptanoylbenzoylmethane,
   stearoylbenzoylmethane,
   dibenzoylmethane,
   calcium acetylacetonate and
   zinc acetylacetonate.

2. The stabilizing ingredient as defined by claim 1, wherein:
   product A comprises a mixture of β-dicarbonyl compounds where said mixtures contain at least 10% by weight of β-dicarbonyl compounds.

3. The stabilizing ingredient as defined by claim 1, wherein the products A and B and their proportions are such that a stabilizing synergy is present when 0.2 part by weight of the stabilizing ingredient is introduced per 100 parts by weight of PVC comprising at least 25 parts by weight of a plasticizer.

4. The ingredient as defined by claim 1, wherein the product B comprises dimethyl adipate, or a mixture of dimethyl adipate, dimethyl glutarate and dimethyl succinate, or diisobutyl adipate, or a mixture of diisobutyl adipate, diisobutyl glutarate and diisobutyl succinate.

5. The ingredient as defined by claim 1, wherein:
   the product A is based on dibenzoylmethane,
   the product B is dimethyl adipate or a mixture of dimethyl adipate, dimethyl glutarate and dimethyl succinate, and
   the ratio of the product A to the product B ranges from 50/50 to 5/95.

6. The ingredient as defined by claim 1, wherein:
   the product A is based on 5-methyl-1-phenylhexane-1,3-dione,
   the product B is dimethyl adipate, or a mixture of dimethyl adipate, dimethyl glutarate, and dimethyl succinate, and
   the ratio of the product A to the product B ranges from 75/25 to 10/90.

7. The ingredient as defined by claim 1, wherein:
   the product A is based on stearoylbenzoylmethane,
   the product B is dimethyl adipate, or a mixture of dimethyl adipate, dimethyl glutarate, and dimethyl succinate, and
   the ratio of the product A to the product B ranges from 75/25 to 10/90.

8. An additive composition for halogenated polymers comprising the stabilizing ingredient as defined by claim 1 and additives selected from the group consisting of:
   stabilizing agents other than the β-dicarbonyl compounds of the product A,
   lubricating agents,
   plasticizers selected from the group consisting of alkyl phthalates; citrates;

esters of benzoic monoacids or polyacids, phosphate esters; phenol sulfonate esters and mixtures thereof,
fillers,
PVC, when the composition is a masterblend comprising less than 50% by weight of PVC, and
mixtures or combinations thereof.

9. A stabilized composition comprising:
(a) a halogenated polymer,
(b) a stabilizer selected from the group consisting of:
  (i) A stabilizing ingredient for halogenated polymers, comprising at least one β-dicarbonyl compound, said ingredient comprising a composition containing at least 90% by weight of the following products A and B:
    product A: a β-dicarbonyl compound or mixture of β-dicarbonyl compounds or complex mixture which comprises at least one β-dicarbonyl compound, said mixtures containing at least 5% by weight of β-dicarbonyl compounds, and
    product B: a solvent which is liquid at 20° C. in which the product A is at least partially soluble, wherein the solvent comprises at least one diester of formula $R^1OOC-(CH_2)_n-COOR^2$, in which $R^1$ and $R^2$, which may be identical or different, are each linear or branched $C_1$-$C_6$ alkyl, or aryl, alkaryl, or arylalkyl radicals having up to 10 carbon atoms, and n is a mean number ranging from 2 to 4, and said product A being at least partially dissolved in said product B, and
  (ii) product A, a β-dicarbonyl compound or mixture of β-dicarbonyl compounds or complex mixture which comprises at least one β-dicarbonyl compound, said mixtures containing at least 5% by weight of β-dicarbonyl compounds, and product B, a solvent which is liquid at 20° C. in which the product A is at least partially soluble, wherein the solvent comprises at least one diester of formula $R^1OOC-(CH_2)_n-COOR^2$, in which $R^1$ and $R^2$, which may be identical or different, are each linear or branched $C_1$-$C_6$ alkyl, or aryl, alkaryl, or arylalkyl radicals having up to 10 carbon atoms, and n is a mean number ranging from 2 to 4, wherein the ratio by weight of the product A to the product B is from 90/10 to 10/90, and
(c) optionally, additives other than said stabilizing ingredient where the additives are selected from the group consisting of:
stabilizing agents other than the β-dicarbonyl compounds of the product A,
lubricating agents,
plasticizers selected from the group consisting of alkyl phthalates; citrates;
esters of benzoic monoacids or polyacids, phosphate esters; phenol sulfonate esters and mixtures thereof,
fillers, PVC, when the composition is a masterblend comprising less than 50% by weight of PVC, and
mixtures or combinations thereof.

10. The stabilized composition as defined by claim 9, wherein the halogenated polymer is poly(vinyl chloride).

11. The stabilized composition as defined by claim 9, wherein said composition comprises a flexible or semi-rigid composition containing a plasticizer in the form of a power or granules suited to be formed or in the form of formed manufactured products.

12. A process for the preparation of a stabilized composition as defined by claim 9, the process comprising introducing into a molten halogenated polymer the following ingredients:
(a) a stabilizer selected from the group consisting of:
  (i) A stabilizing ingredient for halogenated polymers, comprising at least one β-dicarbonyl compound, said ingredient comprising a composition containing at least 90% by weight of the following products A and B:
    product A: a β-dicarbonyl compound or mixture of β-dicarbonyl compounds or complex mixture which comprises at least one β-dicarbonyl compound, said mixtures containing at least 5% by weight of β-dicarbonyl compounds, and
    product B: a solvent which is liquid at 20° C. in which the product A is at least partially soluble, wherein the solvent comprises at least one diester of formula $R^1OOC-(CH_2)_n-COOR^2$, in which $R^1$ and $R^2$, which may be identical or different, are each linear or branched $C_1$-$C_6$ alkyl, or aryl, alkaryl, or arylalkyl radicals having up to 10 carbon atoms, and n is a mean number ranging from 2 to 4, and said product A being at least partially dissolved in said product B, and
  (ii) product A, a β-dicarbonyl compound or mixture of β-dicarbonyl compounds or complex mixture which comprises at least one β-dicarbonyl compound, said mixtures containing at least 5% by weight of β-dicarbonyl compounds, and product B, a solvent which is liquid at 20° C. in which the product A is at least partially soluble, wherein the solvent comprises at least one diester of formula $R^1OOC-(CH_2)_n-COOR^2$, in which $R^1$ and $R^2$, which may be identical or different, are each linear or branched $C_1$-$C_6$ alkyl, or aryl, alkaryl, or arylalkyl radicals having up to 10 carbon atoms, and n is a mean number ranging from 2 to 4,
(b) optionally, a plasticizer,
(c) optionally, other additives, other than the plasticizer and said stabilizer,
(d) optionally, additives other than said stabilizer where the additives are selected from the group consisting of:
stabilizing agents other than the β-dicarbonyl compounds of the product A,
lubricating agents,
fillers,
PVC, when the composition is a masterblend comprising less than 50% by weight of PVC, and
mixtures or combinations thereof.

13. The stabilizing ingredient as defined by claim 1, wherein product A comprises a mixture of β-dicarbonyl compounds containing at least 10% by weight of β-dicarbonyl compounds relative to the total weight of product A.

14. The stabilizing ingredient as defined by claim 1, wherein product A comprises a mixture of β-dicarbonyl compounds containing at least 50% by weight of βp-dicarbonyl compounds relative to the total weight of product A.

15. The stabilizing ingredient as defined by claim 1, wherein product A comprises a mixture of β-dicarbonyl compounds containing at least 80% by weight of β-dicarbonyl compounds relative to the total weight of product A.

16. The stabilizing ingredient as defined by claim 1, wherein:
said stabilizing ingredient comprises at least 10% by weight of β-dicarbonyl compounds relative to the total weight of the stabilizing ingredient.

17. The stabilized composition of claim 9, wherein said additives are selected from the group consisting of:
stabilizing agents other than the β-dicarbonyl compounds of the product A, lubricating agents,
plasticizers selected from the group consisting of alkyl phthalates; citrates; esters of benzoic monoacids or polyacids, phosphate esters; phenol sulfonate esters and mixtures thereof,
fillers,
PVC, when the composition is a masterblend comprising less than 50% by weight of PVC, and
mixtures or combinations thereof.

\* \* \* \* \*